P. MUELLER.
BATH OR BASIN FITTING.
APPLICATION FILED OCT. 31, 1908.
1,000,538.
Patented Aug. 15, 1911.
2 SHEETS—SHEET 1.
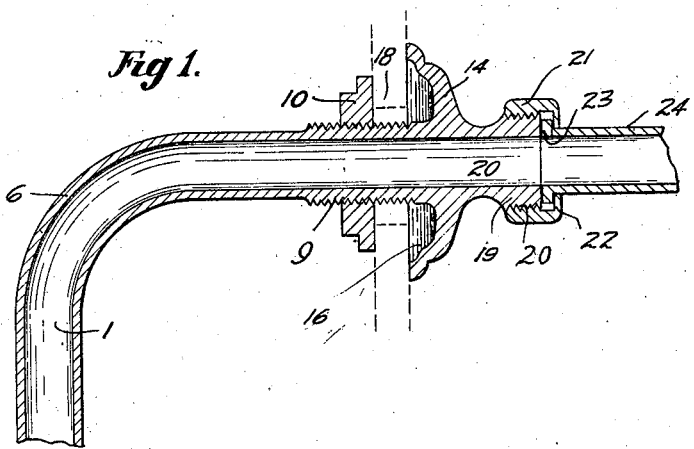
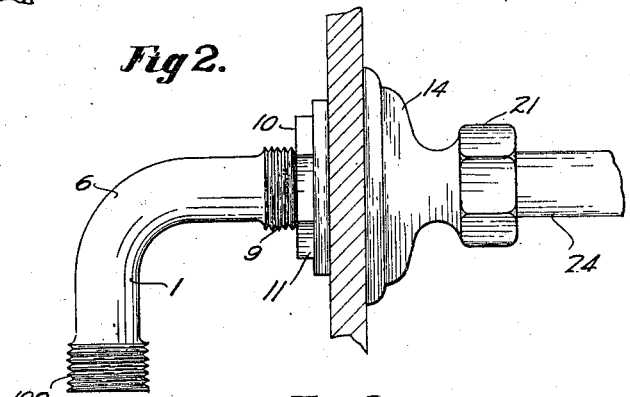
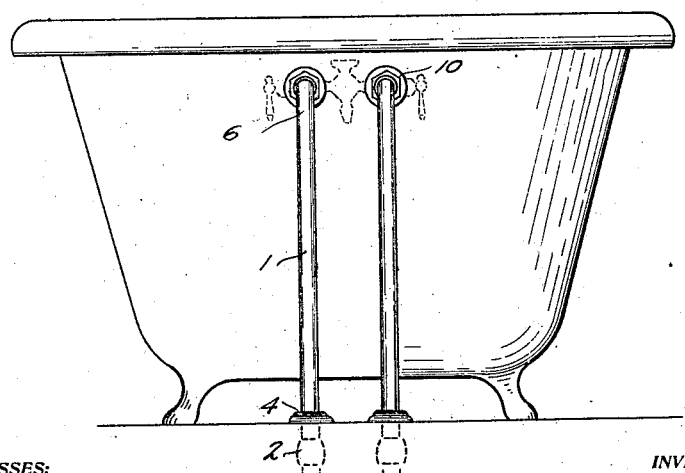
WITNESSES:
INVENTOR
*Philip Mueller*
BY
*Waddell*
ATTORNEY P. MUELLER.
BATH OR BASIN FITTING.
APPLICATION FILED OCT. 31, 1908.
1,000,538.
Patented Aug. 15, 1911.
2 SHEETS—SHEET 2.
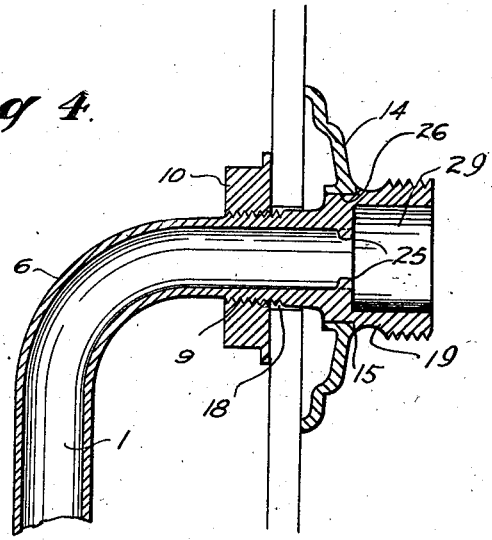
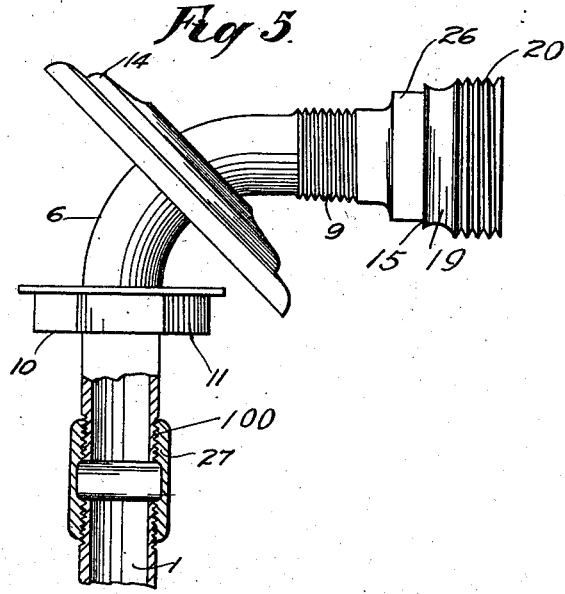
Witnesses.
K. Waddell
Virginia Hamilton
Inventor
Philip Mueller
By John L. Waddell
Attorney

UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

BATH OR BASIN FITTING.

1,000,538.        Specification of Letters Patent.     Patented Aug. 15, 1911.

Application filed October 31, 1908. Serial No. 460,436.

*To all whom it may concern:*

Be it known that I, PHILIP MUELLER, a citizen of the United States, and resident of Decatur, Macon county, State of Illinois, have invented certain new and useful Improvements in Bath or Basin Fittings; and my preferred manner of carrying out the invention is set forth in the following full, clear, and exact description, terminating with claims particularly specifying the novelty.

This invention relates to baths and closets, and more especially to bath and basin fittings, and the object of the same is to facilitate the attachment of the fitting to a bath tub and the coupling of a single or compound faucet thereto.

Another object is to lessen the labor and expense of manufacture by reducing the number of parts to a minimum, yet without sacrificing the utility of the fitting or producing difficulty with its use even in cramped quarters.

To this end the invention consists in a fitting which comprises a supply pipe having its inner end larger than the hole through the tub wall and its body threaded where it passes through said hole, an inner flange irremovable off the inner end of said pipe, an outer nut engaging said threads, and a detachable coupling between the faucet shank and the inner end of the supply pipe.

The invention further resides in a new article of manufacture, comprising a coupling-pipe or member having an externally threaded shank adapted to extend through an aperture in a lavatory member, such as a bath-tub, basin or the like, and provided outside said member with an elongated extension of reduced external diameter throughout its length adapted for connection with a service pipe, and clamping devices on said shank for engaging the opposite walls or faces of the lavatory member, whereby the fitting may be applied by passing the extension through the aperture in the lavatory member from the inside and then slipping one of the clamping devices over the end of the extension opposite the shank end from the outside.

The following specification sets forth certain embodiments of this idea in two forms in one of which the inner flange is integral with the supply, whereas in the other it is removably mounted thereon over the outer end of the supply pipe.

In the drawings—Figure 1 is a sectional view showing one form of this fitting clamped to a tub wall and the supply pipe broken away adjacent its bend; Fig. 2 is a side elevation of the same form, showing the supply pipe as having a threaded outer end; Fig. 3 is an end elevation of the tub showing two of these fittings in place and leading from the compound faucet down through the floor flanges to the service pipes which are indicated in dotted lines; Fig. 4 is a section of another form of this invention wherein the flange is mounted against a shoulder on the thimble, but the view is otherwise similar to Fig. 1; and Fig. 5 is an elevation of this form of fitting with a threaded outer end, showing its nut and flange as run back out of the positions which they occupy in Fig. 4.

In setting up the usual bath tub and its fittings the general practice is to bring the tub into the position it is to occupy, connecting the supply with the service either before or after the tub is so located, then stick the tail piece of the faucet through the hole in the tub wall, and finally make the coupling between this tail piece and the supply pipe at a point outside the tub wall and beneath its rim. In cramped quarters where said rim stands quite close to the wall it is often difficult for the workman to make this connection because the space is limited, the light is poor, and he finds trouble in using his tools. By the present invention I do away with the necessity for having any joint or connection in the supply pipe at a point so near the tub rim that it would be difficult to manipulate a tool there, although such a connection may exist and can easily be reached if nothing stands too close to that end of the tub. The connection between the supply and the service is usually a wipe joint, often made below the floor line as indicated in Fig. 3, and where the workman has more room by reason of the inward deflection of the end of the tub wall.

Referring to the accompanying drawings, the numeral 1 designates the supply pipe comprising a shank and a leg portion or extension, the latter being connected by a wipe joint 2 with the service pipe 3 beneath the floor flange 4, and continuous and integral from such connection upward through its bend 6, through a hole 18 in the tub wall, to the faucet 24; although in Figs. 2 and 5 the supply pipe is made shorter and its outer end is threaded as at 100 beyond its bend for connection with another section of supply pipe if desired or for connection with the service in case the latter should stand above the floor line. Where the shank of the supply pipe passes through the tub wall it is provided with threads 9 larger than the diameter of its body, and also preferably larger than the threads 100 if they are used, beyond the threads 9 it is by preference still further enlarged slightly into a thimble 19 whose inner end is provided with threads 20 of standard size for the reception of a coupling nut 21. The latter here has a shoulder 22 at its inner end which is swiveled behind a shoulder 23 on the faucet shank 24 as will be clearly understood without further illustration.

The numeral 14 designates a flange, preferably dished as at 16 on the side adjacent the tub wall, and on sheet 1 this flange is shown as cast integral with the thimble 19 which reduces the number of parts to a minimum. On sheet 2, however, the thimble is enlarged at 26 and shouldered as at 15 and the flange has a cylindrical bore larger than threads 9 and of a size to fit tightly against said shoulder.

The numeral 10 designates a nut of any approved pattern, threaded to fit the threads 9 and having wrench-hold 11, but the opening through the threads in the nut is by preference larger than the diameter of the leg portion of the pipe 1 (and its threads 100 if employed) so that it as well as the flange if the latter is removable may be passed over the length of the supply pipe and taken off its inlet end. In the construction shown in Figs. 1 and 3, this fitting therefore requires but two members between the service and the faucet—one being the supply with its integral flange, and the other the nut. In the construction shown in Fig. 4 there are three members because the flange is not integral with the supply. In attaching a fixture of this character the nut is removed from the supply, the inlet end of the latter is passed through the hole 18 in the tub wall from the inside either before or after setting the tub in place, the nut is then run over the body of the supply and engaged with the threads 9, of the shank, the tub may then be brought into position where it is to be finally located and connection made between the supply pipe and the service, the nut 10 is then tightened up to clamp the tub wall between it and the flange, and finally the faucet is applied and coupled to the thimble by work performed wholly and entirely within the tub where the light is ample and the workman can readily use his tools. If there are hot- and cold-water pipes as shown in Fig. 3 the operation is precisely the same except that probably the faucet would be coupled to the two supply pipes before the final tightening up of the nuts 10— thus permitting the pipes to adjust and aline themselves with the shanks of the compound faucet by slight movements within the holes 18 through which they of course pass loosely. This improved fitting renders it possible to set up and connect a tub in an extremely small space, because obviously all the workman has to do under the tub rim is to tighten up the nut 10, the connection with the service is usually at or beneath the floor line where there is more space, and the faucet is attached within the tub as explained. Yet I do not limit myself to a supply pipe which is continuous and integral from the service to the faucet, but as shown in Figs. 2 and 5 the supply may be in sections coupled or connected to each other in any suitable manner, as by a nut 27 engaging their threads 100. The bore of the thimble 19 need not necessarily be a continuation of that of the supply 1, and in Fig. 4 it is shown as enlarged at 29 at a point entirely within the tub so as not only to save metal but also to provide a chamber within which could work the valve of the faucet, especially if the latter be of the Fuller type. At the juncture of said chamber with the bore of the supply I may provide inwardly projecting radial lugs 25 whereby a tool such as a screw driver could be inserted to hold the fitting against rotation while the nut 10 was being set up.

From the foregoing description, taken in connection with the accompanying drawing, it will be seen that I provide a new article of manufacture, comprising an improved coupling member that is more or less universally applicable to existing plumbing conditions and wherein the usual coupling joints which generally exist in fittings of this type at or adjacent the rim of the tub or directly beneath the slab of a basin, and which joints are very difficult to make, owing to the limited space the plumber has in which to manipulate his tools, are entirely dispensed with, the said coupling-pipe, in one of the forms herein shown, consisting of a single unitary structure which extends from the faucet, through the aperture in the lavatory member to the service pipe, there being no separable coupling joints between its ends.

My improved construction of coupling-pipe may be applied by passing the extension or leg portion through the aperture in the tub wall, from the inside of the tub, and then slipping the clamping device over the end of the extension opposite the shank end, the said clamping device being brought into threaded engagement with the threaded portion of the pipe and into clamping contact with a wall of the tub or other lavatory member in order to hold the fitting securely in place. The fact that the fitting may be applied from the inside of the tub, in the manner stated, is of considerable importance and a great advantage especially in instances where the space provided for the bath-tub is so limited as to render it impossible or impracticable to apply the fitting after the tub has been placed in position. With my improved construction the fitting may be applied to the tub before the latter is set in position, and it also may be applied after the tub has been set where there is proper space to work.

What is claimed as new is:

1. As a new article of manufacture, a lavatory fitting, comprising a faucet attaching member having an externally threaded shank adapted to extend through the aperture in the lavatory member, and provided outside of the lavatory member with an elongated extension of reduced external diameter throughout its length adapted for connection with the service pipe, and clamping devices on said shank for engaging the opposite faces of the lavatory member, whereby the fitting may be applied by passing the extension through the aperture in the lavatory member from the inside and then slipping one of the clamping devices over the end of the extension opposite the shank end.

2. As a new article of manufacture, a bath-tub fitting comprising a supply-pipe having an externally threaded shank-portion adapted to extend through an aperture in a tub wall and a relatively long leg portion of less external diameter than the said shank portion, said leg portion having a bend at a point adjacent the shank portion, and clamping devices associated with the shank portion of the pipe for clamping the same to the wall of a bath tub, one of said devices being adapted to be slipped over the said leg portion and into engagement with the threads of the shank portion, the construction and arrangement of parts being such that there are no separate coupling members in the supply pipe between the bend and the shank portion.

3. The combination with a lavatory receptacle such as a bath-tub, basin or the like, having an aperture in its wall, a faucet body and a service pipe, of a supply leading from said faucet through the said aperture to the service pipe, and comprising a shank threaded where it passes through the aperture and a leg portion, that portion of the shank within the lavatory receptacle being larger in diameter than the leg portion of the supply to provide a chamber for the valve of the faucet, means for coupling the faucet to said shank, a stop member associated with the shank for engaging one wall of the lavatory receptacle, and a clamping nut also associated with the shank for engaging the opposite wall of the said receptacle, said clamping nut being adapted to be slipped over the leg portion of the supply and into engagement with the threaded portion of the shank.

4. A bath-tub fitting comprising a supply pipe having an enlarged thimble at its inner end provided with a shoulder facing away from said end, threads on the body adjacent said shoulder, a flange adapted to be slipped over the body and threads and to fit on said shoulder, and a nut adapted to be slipped over the body and engaged with the threads.

5. The combination with a bath-tub having an aperture in its wall; of a fitting comprising a supply pipe threaded where it passes through said aperture and enlarged at its inner end to a size larger than the aperture, a shoulder on said enlarged portion facing away from the inner end, a flange adapted to be slipped over the body of the pipe and engaged with said shoulder, a faucet, means for connecting it with said end, and a nut adapted to be slipped over the body of the pipe and to engage said threads against the outer face of the tub wall.

6. The combination with a bath-tub having an aperture in its wall, a faucet, and a service pipe; of a supply leading from said faucet through the aperture to the service pipe and enlarged within the tub to a size larger than said aperture, the body of the supply being threaded where it passes through the aperture, a nut adapted to be slipped over the body of the supply and to engage said threads, and means for connecting the faucet and service to the extremities of said supply.

7. The combination with a bath-tub having an aperture in its wall, a faucet, and a service pipe; of an integral supply pipe leading from said faucet through the aperture to the service pipe and enlarged within the tub to a size larger than said aperture, the body of the supply pipe being threaded where it passes through the aperture, a nut adapted to be slipped over the body of the supply pipe and to engage said threads, and means for connecting the faucet and service to the extremities of said supply pipe.

8. The combination with a bath-tub having an aperture in its wall, a faucet, and a service pipe; of a supply leading from said faucet through the aperture to the service pipe and enlarged within the tub to a size larger than said aperture, the body of the supply being threaded where it passes through the aperture and bent at a point beyond said threads, a nut engaging said threads, and means for connecting the faucet and service to the extremities of said supply.

9. The combination with a bath-tub having an aperture in its wall, a faucet, and a service pipe; of an integral supply pipe leading from said faucet through the aperture to the service pipe and enlarged within the tub to a size larger than said aperture, the body of the supply pipe being threaded where it passes through the aperture and bent at a point beyond said threads, a nut on said threads, and means for connecting the faucet and service to the extremities of said supply.

10. The combination with a bath-tub having an aperture in its wall, a faucet, and a service pipe; of an integral supply pipe leading from said faucet through the aperture to the service pipe and having a flange within the tub larger than said aperture, the body of the supply pipe being threaded where it passes through the aperture, a nut adapted to be slipped over the body of the supply pipe and to engage said threads, and means for connecting the faucet and service to the extremities of said supply.

11. The combination with a bath-tub having an aperture in its wall, a faucet, and a service pipe; of an integral supply pipe leading from said faucet through the aperture to the service pipe and having a shoulder within the tube, the body of the supply pipe being threaded where it passes through the aperture, a flange and a nut adapted to be slipped over the body of the supply until the flange engages said shoulder and the nut engages said threads, and means for connecting the faucet and service pipe to the extremities of said supply.

In testimony whereof, I have hereunto subscribed my signature, this 22nd day of October, A. D. 1908.

PHILIP MUELLER.

Witnesses:
 VIRGINIA HAMILTON,
 JOHN L. WADDELL.